United States Patent
Choe et al.

(10) Patent No.: US 12,200,398 B2
(45) Date of Patent: Jan. 14, 2025

(54) PIXEL BLENDING FOR SYNTHESIZING VIDEO FRAMES WITH OCCLUSION AND WATERMARK HANDLING

(71) Applicant: Samsung Electronics Co., Ltd., Suwon-si (KR)

(72) Inventors: Gyeongmin Choe, San Jose, CA (US); Yingmao Li, Allen, TX (US); John Seokjun Lee, Allen, TX (US); Hamid R. Sheikh, Allen, TX (US); Michael O. Polley, Garland, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 396 days.

(21) Appl. No.: 17/591,040

(22) Filed: Feb. 2, 2022

(65) Prior Publication Data
US 2022/0303495 A1  Sep. 22, 2022

Related U.S. Application Data

(60) Provisional application No. 63/161,899, filed on Mar. 16, 2021.

(51) Int. Cl.
*H04N 7/01* (2006.01)
*G06T 1/00* (2006.01)
(Continued)

(52) U.S. Cl.
CPC ......... *H04N 7/0137* (2013.01); *G06T 1/0021* (2013.01); *G06T 3/18* (2024.01);
(Continued)

(58) Field of Classification Search
None
See application file for complete search history.

(56) References Cited

U.S. PATENT DOCUMENTS 8,259,198 B2   9/2012   Cote et al.
9,036,082 B2 *  5/2015   Blume ................... H04N 7/014
                                                    348/452

(Continued)

FOREIGN PATENT DOCUMENTS

CN       112488922 A     3/2021
KR    10-2201297 B1      1/2021
(Continued)

OTHER PUBLICATIONS

Reddy D, Veeraraghavan A, Chellappa R. P2C2: Programmable pixel compressive camera for high speed imaging. InCVPR 2011 Jun. 20, 2011 (pp. 329-336). IEEE. (Year: 2011).*

(Continued)

*Primary Examiner* — Michelle M Entezari Hausmann

(57) ABSTRACT

An apparatus includes at least one processing device configured to obtain input frames from a video. The at least one processing device is also configured to generate a forward flow from a first input frame to a second input frame and a backward flow from the second input frame to the first input frame. The at least one processing device is further configured to generate an occlusion map at an interpolated frame coordinate using the forward flow and the backward flow. The at least one processing device is also configured to generate a consistency map at the interpolated frame coordinate using the forward flow and the backward flow. In addition, the at least one processing device is configured to perform blending using the occlusion map and the consistency map to generate an interpolated frame at the interpolated frame coordinate.

20 Claims, 10 Drawing Sheets

(51) Int. Cl.

| | | |
|---|---|---|
| *G06T 3/18* | (2024.01) | |
| *G06T 5/50* | (2006.01) | |
| *G06T 7/207* | (2017.01) | |
| *H04N 1/32* | (2006.01) | |
| *H04N 19/139* | (2014.01) | |
| *H04N 19/577* | (2014.01) | |

(52) U.S. Cl.
CPC ............... *G06T 5/50* (2013.01); *G06T 7/207* (2017.01); *H04N 1/32224* (2013.01); *H04N 19/139* (2014.11); *H04N 19/577* (2014.11); *G06T 2207/20221* (2013.01)

(56) References Cited

U.S. PATENT DOCUMENTS

| | | | | |
|---|---|---|---|---|
| 9,324,131 | B1* | 4/2016 | Selby | H04N 7/0137 |
| 10,531,093 | B2* | 1/2020 | Tang | H04N 19/543 |
| 10,733,783 | B2 | 8/2020 | Vlachos et al. | |
| 10,916,019 | B2 | 2/2021 | Li | |
| 10,943,141 | B2* | 3/2021 | Sawada | G06V 20/58 |
| 10,958,869 | B1 | 3/2021 | Chi et al. | |
| 11,081,139 | B2* | 8/2021 | Oxholm | G06T 11/001 |
| 2004/0189866 | A1* | 9/2004 | Lin | H04N 5/144 |
| | | | | 348/E5.065 |
| 2006/0193535 | A1* | 8/2006 | Mishima | G06V 10/754 |
| | | | | 382/294 |
| 2009/0244389 | A1* | 10/2009 | Mishima | H04N 5/144 |
| | | | | 348/E5.062 |
| 2013/0071041 | A1* | 3/2013 | Jin | G06T 3/4076 |
| | | | | 382/254 |
| 2014/0002441 | A1 | 1/2014 | Hung et al. | |
| 2014/0002733 | A1* | 1/2014 | George | H04N 7/012 |
| | | | | 348/E7.003 |
| 2016/0278678 | A1* | 9/2016 | Valdes | A61B 5/14546 |
| 2017/0064204 | A1* | 3/2017 | Sapiro | G06T 5/20 |
| 2017/0213319 | A1* | 7/2017 | Kurihara | G06T 3/4053 |
| 2018/0096464 | A1* | 4/2018 | Kobayashi | G06T 5/70 |
| 2018/0176574 | A1* | 6/2018 | Tang | H04N 19/543 |
| 2019/0045223 | A1* | 2/2019 | Levy | H04N 19/137 |
| 2019/0050998 | A1 | 2/2019 | Kirby | |
| 2019/0057509 | A1 | 2/2019 | Lv et al. | |
| 2020/0357099 | A1* | 11/2020 | Long | G06T 5/77 |
| 2020/0394752 | A1 | 12/2020 | Liu et al. | |
| 2021/0027480 | A1 | 1/2021 | Ren et al. | |
| 2021/0067735 | A1 | 3/2021 | Reda et al. | |
| 2021/0144364 | A1 | 5/2021 | Li et al. | |
| 2021/0176486 | A1 | 6/2021 | Wang et al. | |
| 2022/0405898 | A1* | 12/2022 | Dolgin | G06T 5/50 |
| 2024/0202881 | A1* | 6/2024 | Cheng | G06T 5/70 |

FOREIGN PATENT DOCUMENTS

| | | |
|---|---|---|
| WO | 2019/040134 A1 | 2/2019 |
| WO | 2021093432 A1 | 5/2021 |

OTHER PUBLICATIONS

Lin, Shyh-Feng, Yu-Ling Chang, and Liang-Gee Chen. "Motion adaptive interpolation with horizontal motion detection for deinterlacing." IEEE Transactions on consumer electronics 49.4 (2003): 1256-1265. (Year: 2003).*

Liu, Qing, et al. "Weakly supervised instance segmentation for videos with temporal mask consistency." Proceedings of the IEEE/CVF Conference on Computer Vision and Pattern Recognition. 2021. (Year: 2021).*

Choe et al., "Accurate Optical Flow Interpolation Optimizing Bi-Directional Consistency and Temporal Smoothness," U.S. Appl. No. 17/591,350, filed Feb. 2, 2022, 42 pages.

International Search Report and Written Opinion of the International Searching Authority dated Jun. 23, 2022 in connection with International Patent Application No. PCT/KR2022/003606, 10 pages.

Non-Final Office Action dated Jun. 4, 2024 in connection with U.S. Appl. No. 17/591,350, 17 pages.

Altunbasak et al., "A Fast Parametric Motion Estimation Algorithm With Illumination and Lens Distortion Correction", IEEE Transactions on Image Processing, vol. 12, No. 4, Apr. 2003, 14 pages.

Yao et al., "Segmentation of touching insects based on optical flow and NCuts", Biosystems Engineering, Feb. 2013, 11 pages.

* cited by examiner

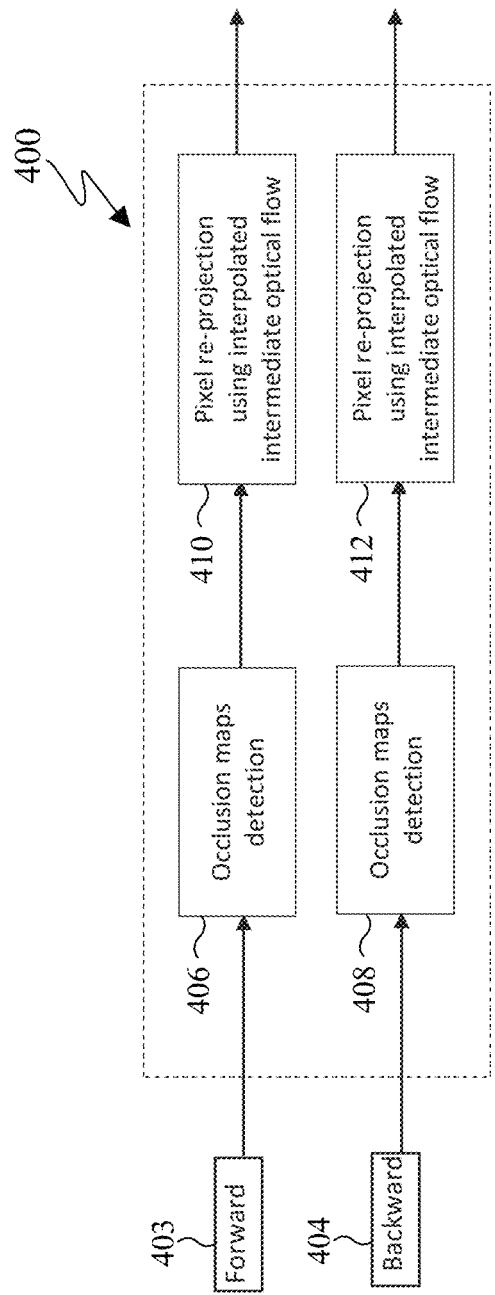
FIG. 4A
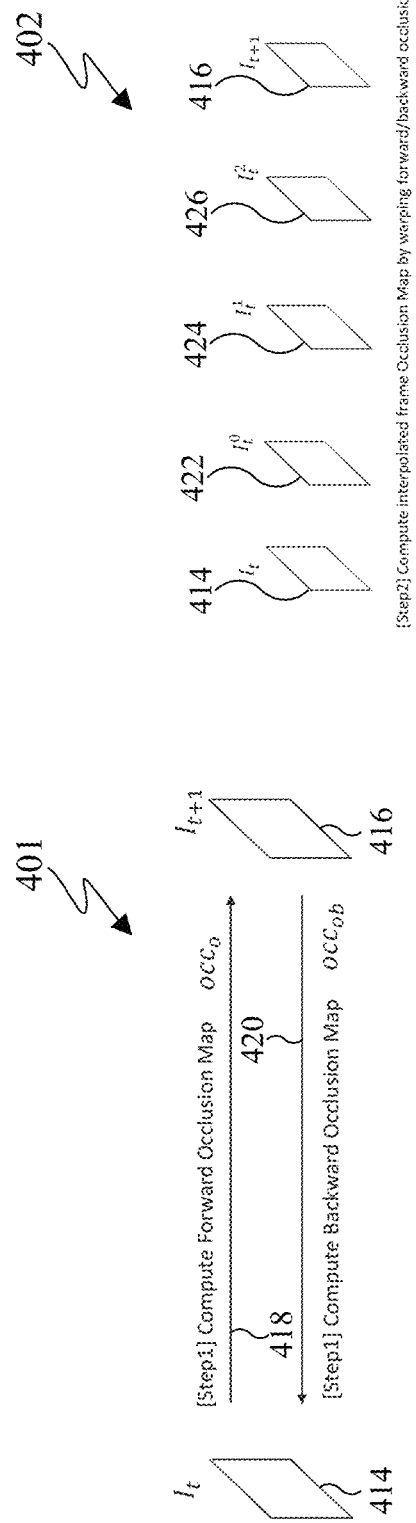
FIG. 4B
FIG. 4C

PIXEL BLENDING FOR SYNTHESIZING VIDEO FRAMES WITH OCCLUSION AND WATERMARK HANDLING

CROSS-REFERENCE TO RELATED APPLICATIONS AND PRIORITY CLAIM

This application claims priority under 35 U.S.C. § 119(e) to U.S. Provisional Patent Application No. 63/161,899 filed on Mar. 16, 2021, which is hereby incorporated by reference in its entirety.

This application is related to U.S. Non-Provisional patent application Ser. No. 17/591,350 filed on Feb. 2, 2022 and entitled "ACCURATE OPTICAL FLOW INTERPOLATION OPTIMIZING BI-DIRECTIONAL CONSISTENCY AND TEMPORAL SMOOTHNESS," which is hereby incorporated by reference in its entirety.

TECHNICAL FIELD

This disclosure relates generally to machine learning systems. More specifically, this disclosure relates to pixel blending for synthesizing video frames with occlusion and watermark handling.

BACKGROUND

Artificial intelligence (AI)-based imaging and video applications are becoming more prevalent features in mobile electronic devices, such as smartphones and tablet computers. For video applications, slow motion videos are gaining significant interest from users. However, many AI-based interpolation techniques are not suitable for producing high-quality slow motion videos. Furthermore, many AI-based video interpolation techniques do not provide handling of possible failure cases or perform artifact control, which makes it difficult for these slow motion techniques to be commercialized.

SUMMARY

This disclosure relates to pixel blending for synthesizing video frames with occlusion and watermark handling.

In a first embodiment, an apparatus includes at least one processing device configured to obtain input frames from a video. The at least one processing device is also configured to generate a forward flow from a first input frame to a second input frame and a backward flow from the second input frame to the first input frame. The at least one processing device is further configured to generate an occlusion map at an interpolated frame coordinate using the forward flow and the backward flow. The at least one processing device is also configured to generate a consistency map at the interpolated frame coordinate using the forward flow and the backward flow. In addition, the at least one processing device is configured to perform blending using the occlusion map and the consistency map to generate an interpolated frame at the interpolated frame coordinate.

In a second embodiment, a method includes obtaining input frames from a video. The method also includes generating a forward flow from a first input frame to a second input frame and a backward flow from the second input frame to the first input frame. The method further includes generating an occlusion map at an interpolated frame coordinate using the forward flow and the backward flow. The method also includes generating a consistency map at the interpolated frame coordinate using the forward flow and the backward flow. In addition, the method includes performing blending using the occlusion map and the consistency map to generate an interpolated frame at the interpolated frame coordinate.

In a third embodiment, a non-transitory machine readable medium contains instructions that when executed cause at least one processor to obtain input frames from a video. The instructions when executed also cause the at least one processor to generate a forward flow from a first input frame to a second input frame and a backward flow from the second input frame to the first input frame. The instructions when executed further cause the at least one processor to generate an occlusion map at an interpolated frame coordinate using the forward flow and the backward flow. The instructions when executed also cause the at least one processor to generate a consistency map at the interpolated frame coordinate using the forward flow and the backward flow. In addition, the instructions when executed cause the at least one processor to perform blending using the occlusion map and the consistency map to generate an interpolated frame at the interpolated frame coordinate.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B"

may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include any other electronic devices now known or later developed.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 4A through 4C illustrate an example re-projected bidirectional occlusion map generation function in accordance with this disclosure;

DETAILED DESCRIPTION

Figure 1:
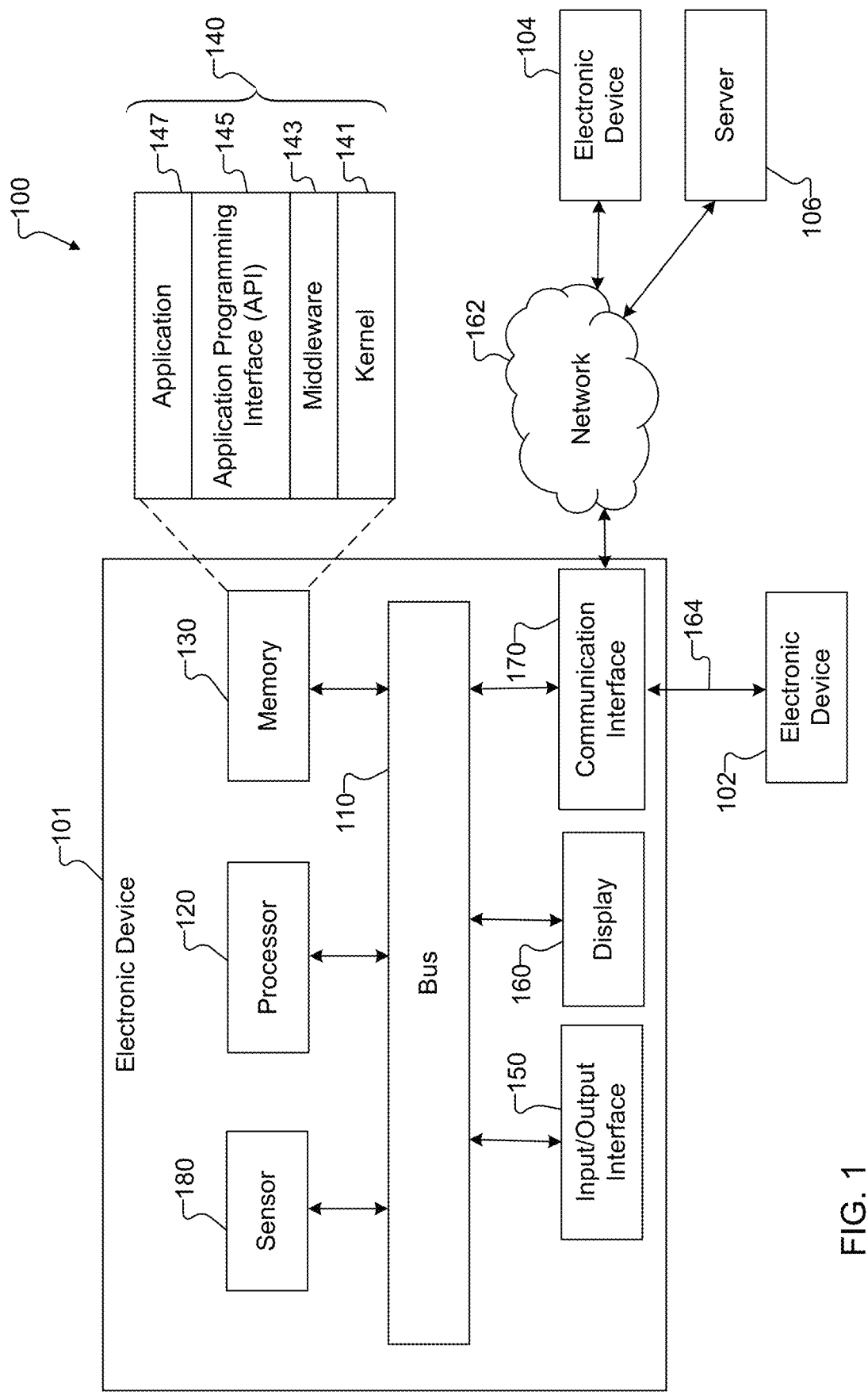
FIG. 1 illustrates an example network configuration including an electronic device in accordance with this disclosure.

FIGS. 1 through 8, described below, and the various embodiments of this disclosure are described with reference to the accompanying drawings. However, it should be appreciated that this disclosure is not limited to these embodiments and all changes and/or equivalents or replacements thereto also belong to the scope of this disclosure.

As noted above, artificial intelligence (AI)-based imaging and video applications are becoming more prevalent features in mobile electronic devices, such as smartphones and tablet computers. For video applications, slow motion videos are gaining significant interest from users. However, many AI-based interpolation techniques are not suitable for producing high-quality slow motion videos. Furthermore, many AI-based video interpolation techniques do not provide handling of possible failure cases or perform artifact control, which makes it difficult for these slow motion techniques to be commercialized.

This disclosure provides techniques for pixel blending to facilitate synthesizing video frames with occlusion and watermark handling. These techniques can be used to provide a fast and accurate video interpolation framework, and the framework is suitable for use by mobile electronic devices (including smartphones and tablet computers). In some cases, convolution neural networks (CNNs) or other machine learning models may be used for per-frame optical flow computation, and other video interpolation functions may be implemented with non-AI algorithms. For example, synthetically-generated bi-directional optical flow ground truth images may be obtained (such as from an UNREAL engine) and used as training data. As a particular example, various human and background models and captured motion information can be imported and, while animations are playing, two-dimensional (2D) motion maps can be saved along with corresponding images (such as red-green-blue or RGB images). The ground truth data can be used to train a machine learning model to function as an optical flow network, which can be trained to estimate forward and backward optical flows simultaneously. In addition, a frame interpolation pipeline can synthesize interpolated frames between input video frames using inferenced optical flow maps. For accurate frame interpolation, bi-directional optical flow post-processing, occlusion handling, and alpha blending using occlusion maps and bi-directional flow consistency maps can be used. Watermark detection and duplicated frame detection may also be supported.

Note that while the functionality of this disclosure is often described with respect to use in mobile devices, such as to support slow motion or ultra-slow motion video playback, this functionality may be used in any other suitable devices and for any other suitable purposes. For instance, this functionality may be used to support high frame rate conversion in electronic devices like smart televisions, such as to convert videos from 60 frames per second (FPS) to 240 FPS. This functionality may also be used to process video content of services like NETFLIX, YOUTUBE, and HULU to enhance videos from lower frame rates to higher frame rates.

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, and a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more of a central processing unit (CPU), a graphics processor unit (GPU), an application processor (AP), or a communication processor (CP). The processor 120 is able to perform control on at least one of the other components of the electronic device 101 and/or perform an operation or data processing relating to communication. In some embodiments of this disclosure, for example, the processor 120 may obtain and process input videos in order to generate interpolated frames using occlusion maps, consistency maps, and alpha blending as described in more detail below.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 may include one or more applications that, among other things, obtain and process input videos in order to generate interpolated frames using occlusion maps, consistency maps, and alpha blending as described in more detail below. These functions can be performed by a single application or by multiple applications that each carries out one or more of these functions.

The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals.

The wireless communication is able to use at least one of, for example, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)), Internet, or a telephone network.

The electronic device 101 further includes one or more sensors 180 that can meter a physical quantity or detect an activation state of the electronic device 101 and convert metered or detected information into an electrical signal. For example, the sensor(s) 180 can include one or more cameras or other imaging sensors, which may be used to capture videos of scenes. The sensor(s) 180 can also include one or more buttons for touch input, one or more microphones, a gesture sensor, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

The first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more cameras.

The first and second external electronic devices 102 and 104 and the server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162 or 164, the electronic device 101 may be independently operated without a separate communication function according to some embodiments of this disclosure.

The server 106 can include the same or similar components as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. In some embodiments of this disclosure, the server 106 may obtain and process input videos in order to generate interpolated frames using occlusion maps, consistency maps, and alpha blending as described in more detail below.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
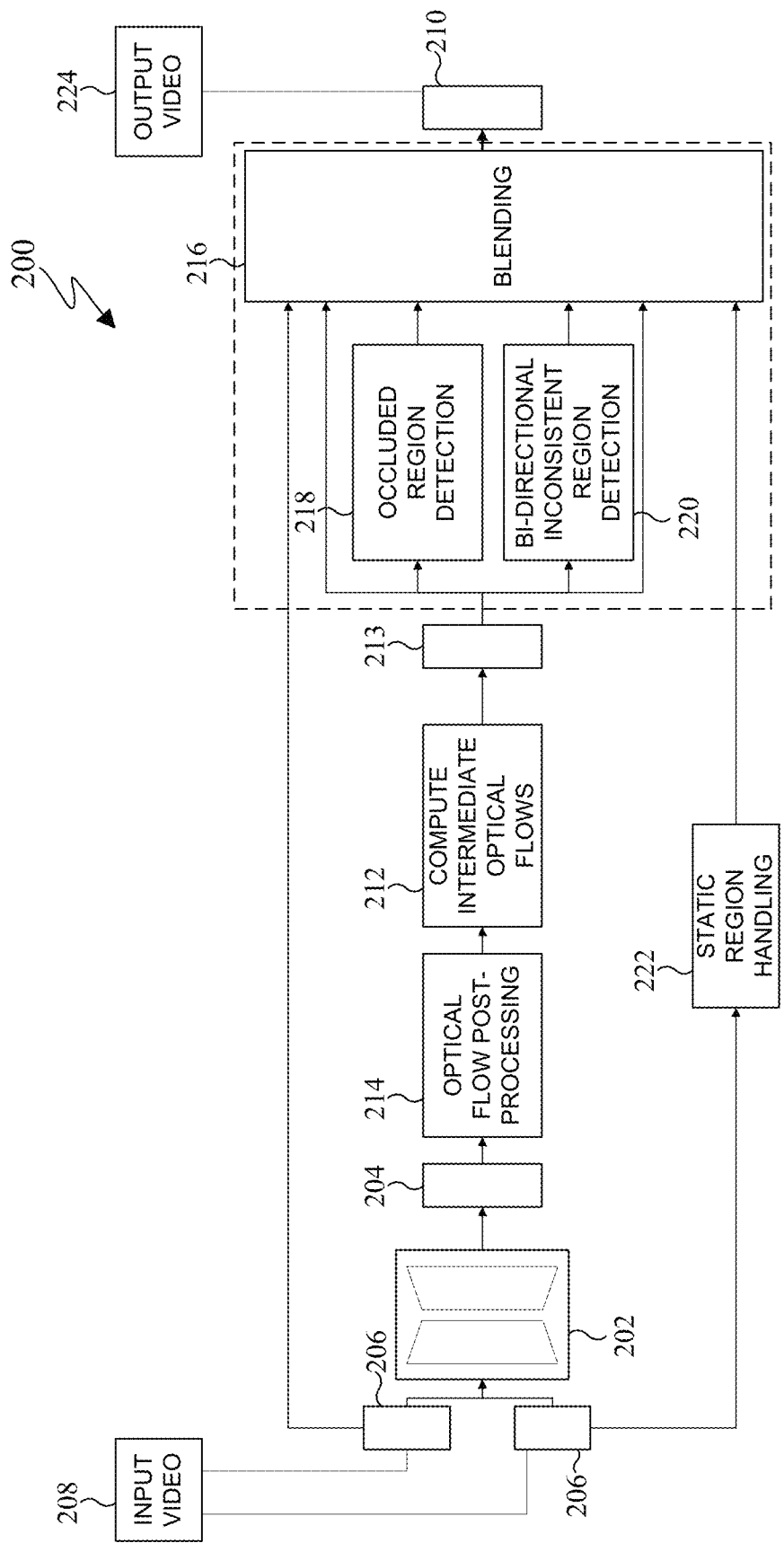
FIG. 2 illustrates an example video interpolation pipeline in accordance with this disclosure.

FIG. 2 illustrates an example video interpolation pipeline 200 in accordance with this disclosure. For ease of explanation, the pipeline 200 is described as being implemented or performed using one or more components of the electronic device 101 described above. However, this is merely one example, and the pipeline 200 could be implemented or performed using any other suitable device(s) and in any other suitable system(s), such as when performed using the server 106.

As shown in FIG. 2, the video interpolation pipeline 200 includes an optical flow network (OFNet) 202. The optical flow network 202 represents a trained machine learning model (such as a CNN or other model) that can be used to simultaneously estimate forward and backward optical flow maps 204 between successive frames 206 of an input video 208. In some cases, the optical flow network 202 may be trained as described above by obtaining synthetically-generated bi-directional optical flow ground truth images (such as by using an UNREAL engine to capture 2D motion maps and RGB or other images while animations are playing) and training a machine learning model to estimate forward and backward optical flows simultaneously. Note, however, that the optical flow network 202 may be trained in any other suitable manner.

The video interpolation pipeline 200 operates to synthesize output frames 210, which include the frames 206 of the input video 208 along with additional interpolated frames generated between successive frames 206 of the input video 208. Among other things, this may allow the interpolation pipeline 200 to produce a higher frame rate version of the input video 208. The interpolated frames are produced using the input frames 206 and refined optical flow maps 213, which are produced by an intermediate optical flow computation function 212. The refined optical flow maps 213 estimate forward and backward optical flows to one or more intermediate points between frames 206 at which the one or more interpolated frames are generated. The refined optical flow maps 213 are generated using the forward and backward optical flow maps 204 after a bi-directional optical flow post-processing function 214. The refined optical flow maps 213 can be used as inputs to a blending function 216, which blends the frames 206 (such as via alpha blending) to produce one or more interpolated frames. For accurate frame interpolation, the pipeline 200 supports the use of an occlusion region detection function 218 (to detect occluded or blocked regions), a bi-directional inconsistent region detection function 220 (to detect inconsistent forward and backward optical flows), and a static region detection function 222 (to detect static regions like letters or watermarks). The output frames 210 may be provided as an output video 224, which represents the input video 208 with one or more additional interpolated frames between successive frames 206 of the input video 208.

Example embodiments of various functions shown in FIG. 2 are described in greater detail below. It should be noted that the functions shown in or described with respect to FIG. 2 can be implemented in an electronic device 101, server 106, or other device in any suitable manner. For example, in some embodiments, at least some of the functions shown in or described with respect to FIG. 2 can be implemented or supported using one or more software applications or other software instructions that are executed by the processor 120 of the electronic device 101, server 106, or other device. In other embodiments, at least some of the functions shown in or described with respect to FIG. 2 can be implemented or supported using dedicated hardware components. In general, the functions shown in or described with respect to FIG. 2 can be performed using any suitable hardware or any suitable combination of hardware and software/firmware instructions.

Although FIG. 2 illustrates one example of a video interpolation pipeline 200, various changes may be made to FIG. 2. For example, various components in FIG. 2 may be combined, further subdivided, replicated, omitted, or rearranged and additional components may be added according to particular needs.

Figure 3:
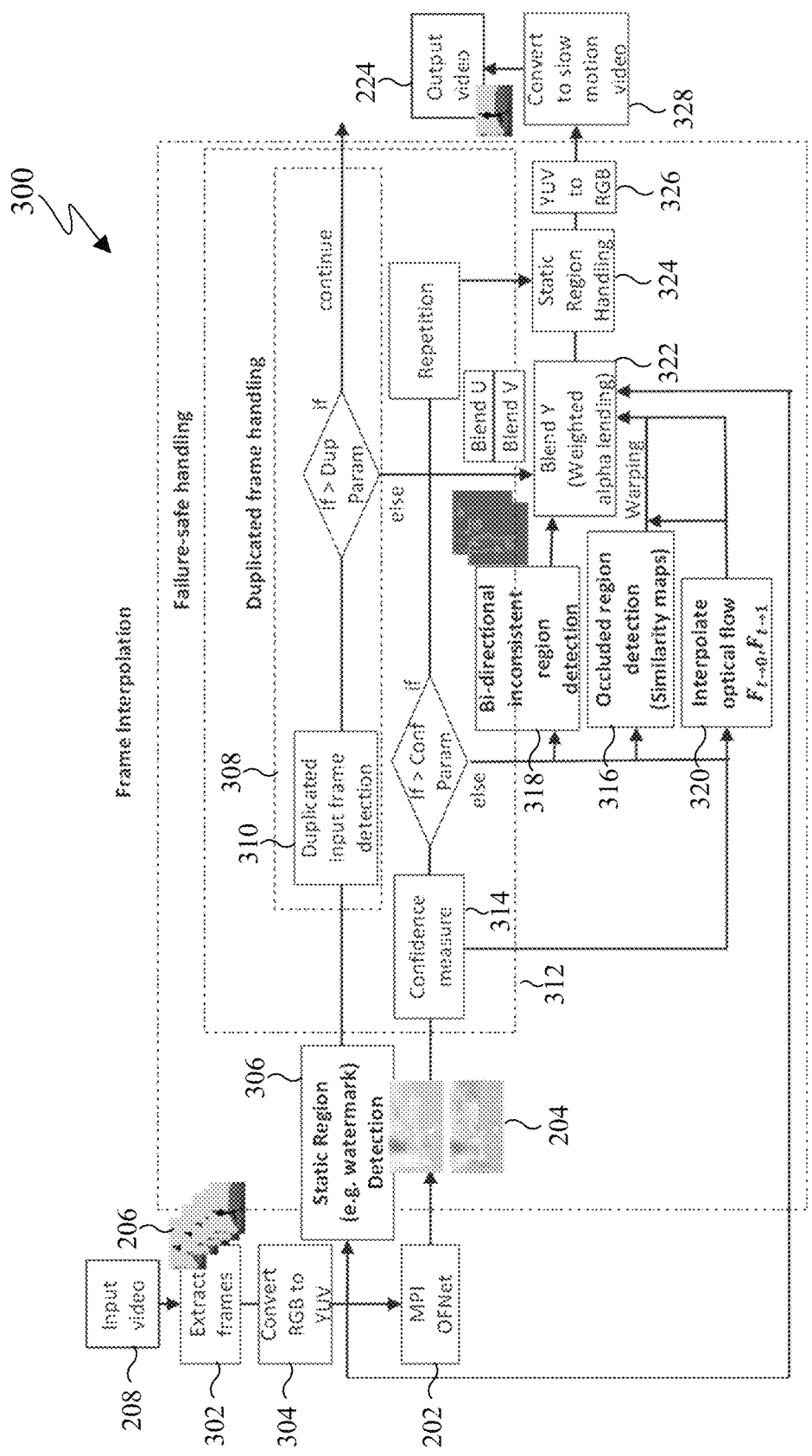
FIG. 3 illustrates another example video interpolation pipeline in accordance with this disclosure.

FIG. 3 illustrates another example video interpolation pipeline 300 in accordance with this disclosure. For ease of explanation, the pipeline 300 is described as being implemented or performed using one or more components of the electronic device 101 described above. However, this is merely one example, and the pipeline 300 could be implemented or performed using any other suitable device(s) and in any other suitable system(s), such as when performed using the server 106.

As shown in FIG. 3, the electronic device 101 can perform a frame extraction function 302 on the input video 208 in order to obtain the video frames 206 from the input video 208. The video frames 206 can be processed to produce interpolated frames between the video frames 206 in the output video 224 (such as to produce a slow-motion version of the input video 208 as the output video 224). The electronic device 101 can also perform an RGB-to-YUV conversion function 304 on the input frames 206, which converts the input frames 206 from the RGB image domain to the YUV image domain. This may be useful, for instance, to reduce computation times.

The converted input frames 206 are provided to the optical flow network 202 for optical flow estimation. Optical flow estimation is a technique for pixel-wise prediction of motion in image frames over time. In the video interpolation pipeline 300, the optical flow network 202 can determine the motion between the converted input frames 206 in order to support accurate generation of interpolated frames. In some embodiments, the optical flow network 202 can include a neural network, such as a CNN, or other trained machine learning model. The output of the optical flow network 202 are forward and backward optical flow maps 204.

A static region detection function 306 is performed here to detect static letter, watermarks, or other static areas in the input video 208. Static letters or watermarks are items in the input video 208 that are not moving or are overlaid on the frames 206. Static letters or watermarks can be identified based on portions of the frames 206 that do not change over time. When static letters or watermarks are identified in the same location in each of the frames 206, a static mask can be generated and used, such as to help avoid faulty interpolation that could cause jitters. The static region detection function 306 may use any suitable technique to identify static image content, such as a Sobel filter for detecting jitter or distortion artifacts. A Sobel filter is a discrete differentiation operator for computing an approximation of a gradient of a frame intensity function.

A duplicated frame handling function 308 is performed here, which includes performance of a duplicated input frame detection function 310. The duplicated input frame detection function 310 is used to automatically detect any duplicated frames 206 in the input video 208. In some cases, metadata for the frames 206 can be saved in a test vector folder, and a pixel intensity difference between adjacent frames 206 can be computed to detect duplicated frames 206. For example, the pixel intensity difference can be compared to a threshold for the determination of duplicated frames 206. The metadata for the frames 206 can be read when consolidating a slow motion video and duplicated frames are not used.

A failure-safe handling function 312 is performed here, which includes use of a confidence measure 314. The confidence measure 314 can measure a confidence of pixels where motion is high. For example, a person or object moving in the foreground of the frames 206 at a high rate could create a forward flow and a backward flow in an area of adjacent frames where the background is also shown. The failure-safe handling function 312 can identify that the background is not moving along with the person or object in the foreground. As a result, interpolated frames may be generated using pixels from the background in one frame 206 without interpolation or blending.

An occluded region detection function 316 is performed to identify occluded or obscured portions of people or objects in frames 206. For example, the occluded region detection function 316 can generate similarity maps (also called occlusion maps) that indicate whether portions of successive frames are similar to one another (where low similarities may be indicative of occlusion). This can be based on forward and backward optical flows generated by the optical flow network 202. One example of the occluded region detection function 316 is described below with respect to FIGS. 4A through 4C.

A bi-directional inconsistent region detection function 318 is performed to determine if and to what extent forward and backward optical flow maps are consistent or inconsistent with one another. For example, the bi-directional inconsistent region detection function 318 can compute bi-directional consistency maps, which can be used to achieve smoothness and sharpness of video frame interpolation. In some cases, a bi-directional consistency map can be generated by computing pixel differences of a warped reference frame using a forward flow and a corresponding warped frame using a backward flow. When multiple interpolated frames are produced between two frames 206, the interpolated frames may be said to have different virtual coordinates, and a bi-directional flow consistency map may be determined for each virtual coordinate. This may allow for blending of bi-directional pixel information seamlessly. One example of the bi-directional inconsistent region detection function 318 is described below in FIGS. 5A and 5B.

An optical flow interpolation function 320 can be performed to generate intermediate optical flows to or between different virtual coordinates associated with a pair of frames 206. For example, a forward intermediate optical flow may be generated from a first frame 206 to a first virtual coordinate, another forward intermediate optical flow may be generated from the first virtual coordinate to a second virtual coordinate, and so on. A final forward intermediate optical flow may be generated from a final virtual coordinate to a second frame 206. Backward intermediate optical flows may be generated in a similar manner from the second frame 206 to the first frame 206.

An occlusion-aware alpha blending function 322 is performed to blend the frames 206 and produce one or more interpolated frames. For example, the occlusion-aware alpha blending function 322 may use the similarity maps, the bi-directional consistency maps, and the intermediate optical flows to blend the frames 206 and produce one or more interpolated frames. In some cases, the occlusion-aware alpha blending function 322 may be performed in two steps. The first step of the occlusion-aware alpha blending function 322 may be performed as follows:

$$I_t^i = \frac{N-i}{N}W(I_t; U_t^i) + \frac{i}{N}W(I_{t+1}; U_{tb}^i) \tag{1}$$

where I represents an interpolated frame, N represents an interpolation rate, $W(I_t; U_t^i)$ represents a warped frame from a forward flow, and $W(I_{t+1}; U_{tb}^i)$ represents a warped frame from a backward flow. The second step of the occlusion-aware alpha blending function 322 can use a reliability mask, which can be determined using the similarity maps and the bi-directional consistency maps. In some cases, the reliability mask can be determined for each intermediate (interpolated) frame as follows:

$$R = 1 \text{if}(occ_{oi} > T_{occ}) \text{ and}(con_i > T_{con}) \tag{2}$$

where R represents the reliability mask, $occ_i$ represents an occlusion or similarity map, $T_{occ}$ represents an occlusion threshold, $T_{con}$ represents a threshold for the consistency map, and $con_i$ represents the consistency map. The reliability mask can be checked for each pixel location and set a value to one when a pixel is determined as not reliable. The unreliability can be due to high error in a consistency map or due to its inclusion in an occluded area. When a pixel is not reliable, the occlusion-aware alpha blending function 322 may use warping solely based on the forward flow, which in some cases may be expressed as follows.

$$I_t^i = W(I_t; U_t^i) \tag{3}$$

To improve the generation of the output video 224, a static region handling function 324 can be performed to reduce jittering and distortion artifacts where static letters or watermarks are present (as determined by the static region detection function 306). For example, the static region handling function 324 may replace blended pixels that have been identified as being within a static region by the static region detection function 306. In some cases, a median filter can be applied to remove isolated noisy pixels, and dilation can be performed to fill up empty regions in static regions. As a particular example, pixels in one or more static regions can be replaced with pixels taken from the first frame 206, which can be expressed as follows.

$$\text{InterpFrame}M(\text{idx}_{wmk}) = 10(\text{idx}_{wmk}) \tag{4}$$

The electronic device 101 can perform a YUV-to-RGB conversion function 326, which converts frames (including at least interpolated frames) from the YUV image domain back to the RGB image domain. This allows the frames to be suitable for viewing in the RGB color space. The converted image frames are provided to a slow motion conversion function 328, which generates the output video 224 representing a slow-motion version of the input video 208. For example, the slow motion conversion function 328 can prepare the frames 206 and the interpolated frames for playback at the original frame rate. With the interpolated frames inserted appropriately among the extracted frames 206, playback at the original frame rate results in a slow-motion version of the input video 208.

Example embodiments of various functions shown in FIG. 3 are described in greater detail below. It should be noted that the functions shown in or described with respect to FIG. 3 can be implemented in an electronic device 101, server 106, or other device in any suitable manner. For example, in some embodiments, at least some of the functions shown in or described with respect to FIG. 3 can be implemented or supported using one or more software applications or other software instructions that are executed by the processor 120 of the electronic device 101, server 106, or other device. In other embodiments, at least some of the functions shown in or described with respect to FIG. 3 can be implemented or supported using dedicated hardware components. In general, the functions shown in or described with respect to FIG. 3 can be performed using any suitable hardware or any suitable combination of hardware and software/firmware instructions.

Although FIG. 3 illustrates another example of a video interpolation pipeline 300, various changes may be made to FIG. 3. For example, various components in FIG. 3 may be combined, further subdivided, replicated, omitted, or rearranged and additional components may be added according to particular needs.

FIGS. 4A through 4C illustrate an example re-projected bidirectional occlusion map generation function 400 in accordance with this disclosure. In particular, FIG. 4A illustrates the re-projected bidirectional occlusion map generation function 400, FIG. 4B illustrates an example generation 401 of initial occlusion maps, and FIG. 4C illustrates an example interpolation 402 of additional occlusion maps between the initial occlusion maps. The function 400 here may, for example, represent an example implementation of the occlusion region detection function 218 or the occluded region detection function 316.

Occluded area handling can be a challenge for good-quality video interpolation. Adjacent frames in videos can have slightly different viewpoints, causing occluded regions for each frame. Not properly handling occluded regions can yield noticeable artifacts when generating interpolated frames. For example, pixels with no information can be generated during interpolation of intermediate frames from occluded regions. A binary occlusion mask can therefore be provided at each interpolated coordinate (each time-based location where an interpolated frame is being generated) to indicate if and where one or more occluded regions are detected. Mathematically, this can be expressed as follows.

Assume $U_t$ is an optical flow vector at time t in an input video. An intermediate optical flow vector $U_t^i$ can be linearly interpolated by based on $$\frac{1}{N} U_t,$$

where N represents an interpolation rate or number of frames to be interpolated between each pair of frames 206. In some cases, for instance, N can be equal to four when converting a video from 30 FPS to 120 FPS.

As shown in FIG. 4A, occlusion maps for a forward direction and a backward direction can be determined as follows. A second input frame (denoted $I_{t+1}$) can be warped to a first input frame (denoted $I_t$) using a backward optical flow (denoted $U_{tb}$), and a pixel error between the first frame and the warped second frame can be determined. In some cases, the pixel error e can be determined as follows:

$$e = \text{sqrt}(W(I_{t+1}; U_{tb}) - I_t) \tag{5}$$

where $W(I_{t+1}; U_{tb})$ represents a warp of the second input frame using the backward optical flow $U_{tb}$. Given a computed pixel error on each pixel from Equation (5), a binary occlusion map can be determined for the first frame as follows:

$$occ_0 = 1, \text{if}(e > T_{occ}) \tag{6}$$

where $T_{occ}$ represents an occlusion threshold. Equation (6) indicates that each pixel $occ_0$ of an occlusion map can be assigned a value of one if the error for that pixel is above the occlusion threshold. The determined occlusion map for the first frame can be interpolated to each intermediate frame coordinate in the forward direction using an intermediate optical flow vector $U_t^i$, which can be expressed as follows:

$$occ_{0i} = W(occ_0; U_{tb}^i) \tag{7}$$

Each occlusion map generated in this manner can be used to produce an interpolated frame. The same type of process can occur in the opposite direction, where the first frame is warped to the second frame using the forward optical flow.

This approach is illustrated in FIG. 4A, where forward and backward optical flows 403 and 404 are used by occlusion map detection functions 406 and 408 to process two frames and generate occlusion maps, such as by using Equations (5) and (6) and the related processing described above. Re-projection functions 410 and 412 can process the occlusion maps in order to interpolate the generated occlusion maps to one or more intermediate frame coordinates, such as by using Equation (7) and the related processing described above. This results in the generation of one or more interpolated occlusion maps, which can be used to generate one or more interpolated frames.

An example of this is shown in FIGS. 4B and 4C, where the function 400 can process a first input frame 414 ($I_t$) and a second input frame 416 ($I_{t+1}$). As shown in FIG. 4B, the function 400 can calculate a forward occlusion map $occ_0$ from the first frame 414 to the second frame 416, and the function 400 can calculate a backward occlusion map $occ_{0b}$ from the second frame 416 to the first frame 414. As shown in FIG. 4C, one or more interpolated occlusion maps 422-426 are then generated between the frames 414 and 416 using the forward and backward occlusion maps.

In some embodiments, the number of interpolated frames to be generated between the frames 414 and 416 can be determined based on a slow motion factor or an interpolation rate. For instance, the electronic device 101 may generate K interpolated frames between the frames 414 and 416, where K is one less than the determined playback speed. In the example shown, based on the playback speed being determined as 4x slower, the electronic device 101 can generate three interpolated frames by performing interpolation. Of course, other numbers of interpolated frames may be produced in other cases. In this example, since three interpolated frames are being generated between the frames 414 and 416, the first intermediate frame could be one fourth of a time period after the first input frame 414 (which is its interpolated frame coordinate), a second intermediate frame could be one fourth of the time period after the first intermediate frame (which is its interpolated frame coordinate), and a third intermediate frame could be one fourth of the time period after the second intermediate frame and one fourth of the time period before the second input frame 416 (which is its interpolated frame coordinate). In order to interpolate the intermediate frames, the electronic device 101 can determine the forward flow or movement of each pixel between the first input frame 414 and the second input frame 416 and the backward flow or movement of each pixel between the second input frame 416 and the first input frame 414. Using the forward flow and the backward flow, the electronic device 101 can generate the interpolated occlusion maps 422-426 between the frames 414 and 416.

Although FIGS. 4A through 4C illustrate one example of a re-projected bidirectional occlusion map generation function 400 and related details, various changes may be made to FIGS. 4A through 4C. For example, various components in FIG. 4A may be combined, further subdivided, replicated, omitted, or rearranged and additional components may be added according to particular needs. Also, the number of interpolated occlusion maps shown in FIG. 4C can easily vary.

Figure 5A:
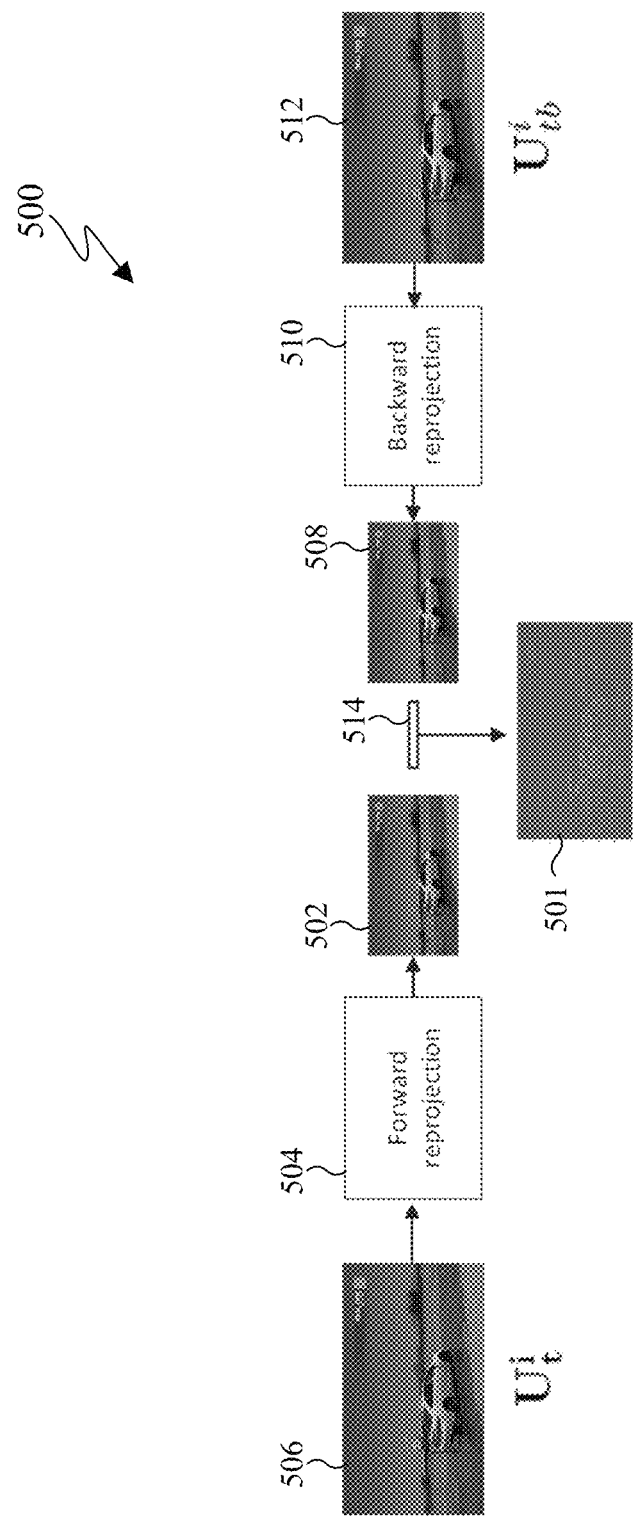
FIGS. 5A and 5B illustrate an example bi-directional flow consistency map generation function in accordance with this disclosure.
Figure 5B:
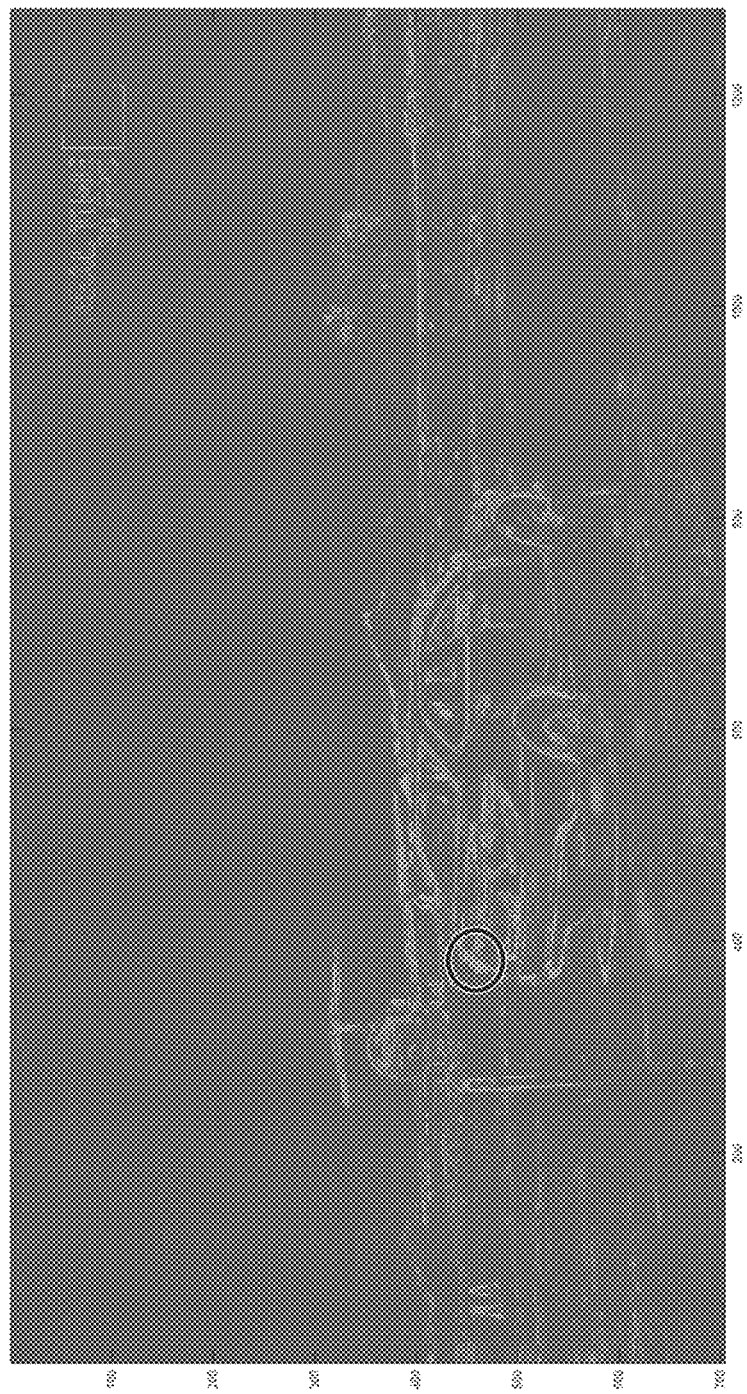

FIGS. 5A and 5B illustrate an example bi-directional flow consistency map generation function 500 in accordance with this disclosure. In particular, FIG. 5A illustrates the bi-directional flow consistency map generation function 500, and FIG. 5B illustrates an example bi-directional flow consistency map 501. The function 500 here may, for example, represent an example implementation of the bi-directional inconsistent region detection function 220 or the bi-directional inconsistent region detection function 318.

Smoothness and sharpness are important image quality criteria for video interpolation. Smoothness and sharpness of slow-motion video can be achieved when bi-directional consistency is met, which means that a forward optical flow and a backward optical flow are consistent. Simply applying both forward and backward interpolation may not guarantee that the forward and backward optical flows are consistent, which can lead to poor video synthesizing results. A bi-directional flow consistency map 501 can be determined for a forward intermediate optical flow vector ($U_t^i$) 506 and a backward intermediate optical flow vector ($U_{tb}^i$) 512, where the consistency map 501 identifies areas where the intermediate optical flows are inconsistent.

As shown in FIGS. 5A, a forward interpolation frame 502 can be generated by performing a forward reprojection 504 using the forward intermediate optical flow vector 506, and a backward interpolation frame 508 can be generated by performing a backward reprojection 510 using the backward intermediate optical flow vector 512. A difference operation 514 can be applied to identify any differences between the forward interpolation frame 502 and the backward interpolation frame 508, and these differences can be used to form the consistency map 501. In some cases, a consistency map 501 can be determined for each interpolated frame being produced as follows:

$$con_i = W(I_t; U_t^i) - W(I_{t+1}; U_{tb}^i) \quad (8)$$

where $con_i$ represents a bi-directional consistency map for intermediate frame i, $W(I_t; U_t^i)$ represents the forward interpolation frame 502 produced by warping the first frame 414 using the forward intermediate optical flow vector 506, and $W(I_t+1; U_{tb}^i)$ represents the backward interpolation frame 508 produced by warping the second frame 416 using the backward intermediate optical flow vector 512.

In an example consistency map 501 shown in FIG. 5B, an outline of a car is most noticeable in the consistency map 501, which may be due to the car having a large amount of rapid motion in the video. The outline of the car can be seen based on difference between the forward interpolation frame 502 and the backward interpolation frame 508. These areas of the consistency map 501 represent areas where there may be the most inconsistency between the forward and backward optical flows at a specified interpolated frame coordinate.

Although FIGS. 5A and 5B illustrate one example of a bi-directional flow consistency map generation function 500 and related details, various changes may be made to FIGS. 5A and 5B. For example, various components in FIG. 5A may be combined, further subdivided, replicated, omitted, or rearranged and additional components may be added according to particular needs. Also, the specific occlusion map shown in FIG. 5B is for illustration only.

Figure 6A:
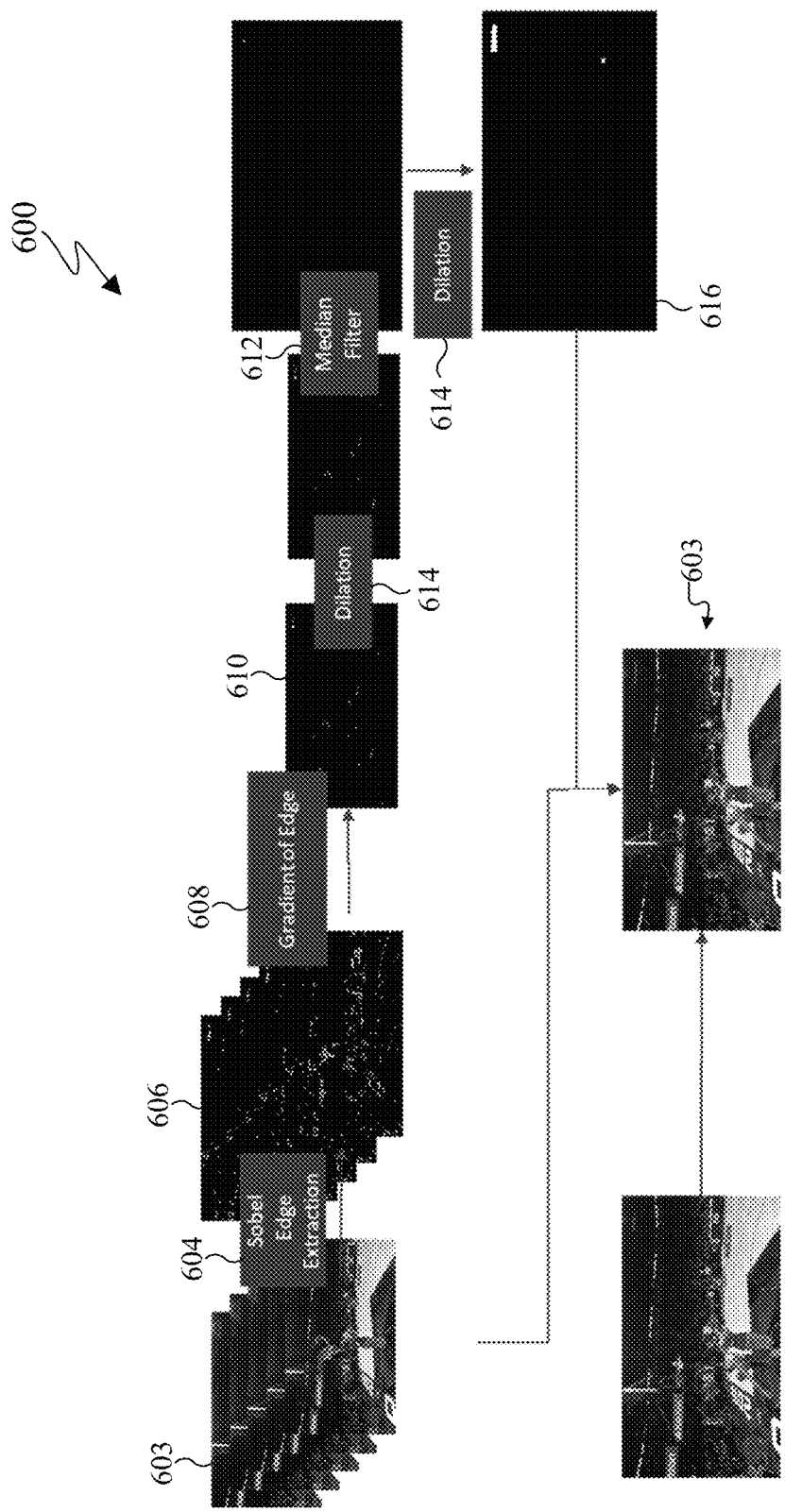
FIGS. 6A through 6C illustrate an example static region detection and handling function in accordance with this disclosure.
Figure 6B:
Figure 6C:
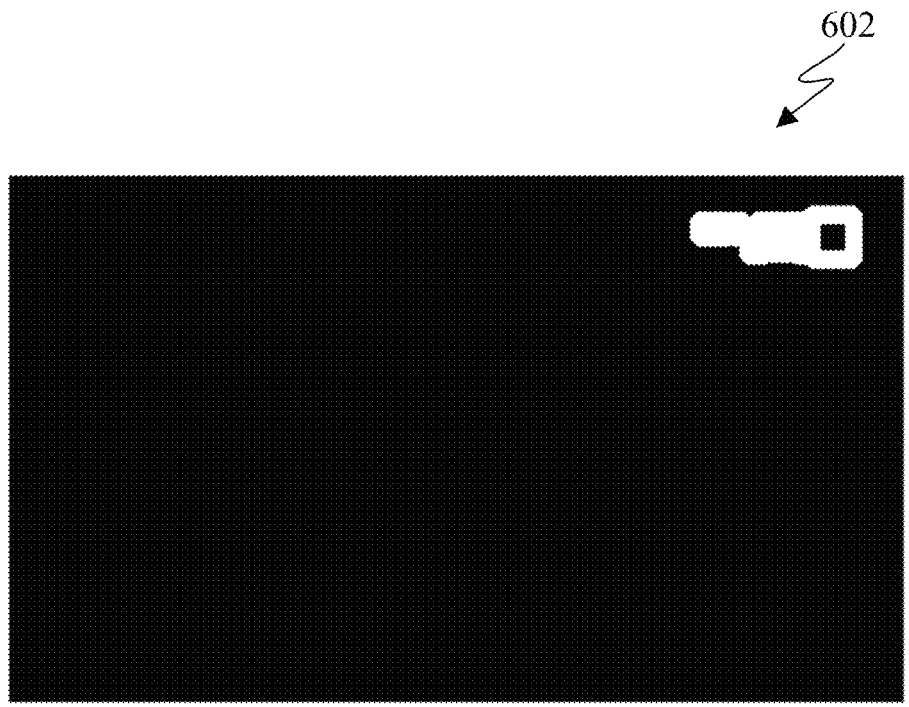

FIGS. 6A through 6C illustrate an example static region detection and handling function 600 in accordance with this disclosure. In particular, FIG. 6A illustrates the static region detection and handling function 600, FIG. 6B illustrates an example frame 601, FIG. 6C illustrates an example static mask 602 for the frame 601. The function 600 here may, for example, represent an example implementation of the static region detection function 222 or the static region detection function 306 and the static region handling function 324.

As shown in FIG. 6A, the static region detection and handling function 600 receives a set of frames 603 as input. In videos where static letters, watermarks, or other content exists, inaccurate optical flow, dilation, or Gaussian smoothing on the frames 603 could yield jittering or distortion artifacts. The function 600 here can be utilized to identify and mask the static letters, watermarks, or other regions. In this example, a Sobel edge extraction filter 604 could be applied to each of the frames 603 in order to extract edges from that frame 603 and produce a corresponding edge extraction map 606. Gradient threshold detection 608 can be applied to the edge extraction maps 606 to identify edges/gradients associated with gradient values above a threshold, which leads to the generation of a gradient map 610. A median filter 612 can be applied to remove isolated noisy pixels from the gradient map 610. Also, dilation 614 can be applied before and/or after the median filter 612 to fill in empty regions occupied by static content. This results in the creation of a static mask 616, which can identify any region or regions of the frames 603 determined to contain static content.

An example of this process is shown in FIGS. 6B and 6C, where a frame 601 is taken from a video in which a watermark 615 is overlaid in the video. Without static region handling, the watermark 615 can appear shaky when a video is played in slow motion or when interpolated frames are otherwise produced. Here, the static mask 602 identifies the area of the frame 601 containing the watermark 615. Based on the static mask 602, pixels in the area of the frame 601 containing the watermark 615 may be taken from one video frame (such as the first frame 414) rather than being interpolated. This can help to avoid poor-quality results obtained by interpolation in the area of the frame 601 containing the watermark 615.

Although FIGS. 6A through 6C illustrate one example of a static region detection and handling function 600 and related details, various changes may be made to FIGS. 6A through 6C. For example, various components in FIG. 6A may be combined, further subdivided, replicated, omitted, or rearranged and additional components may be added according to particular needs. Also, the specific frame 601 and mask 602 shown in FIGS. 6B and 6C are for illustration only.

Figure 7:
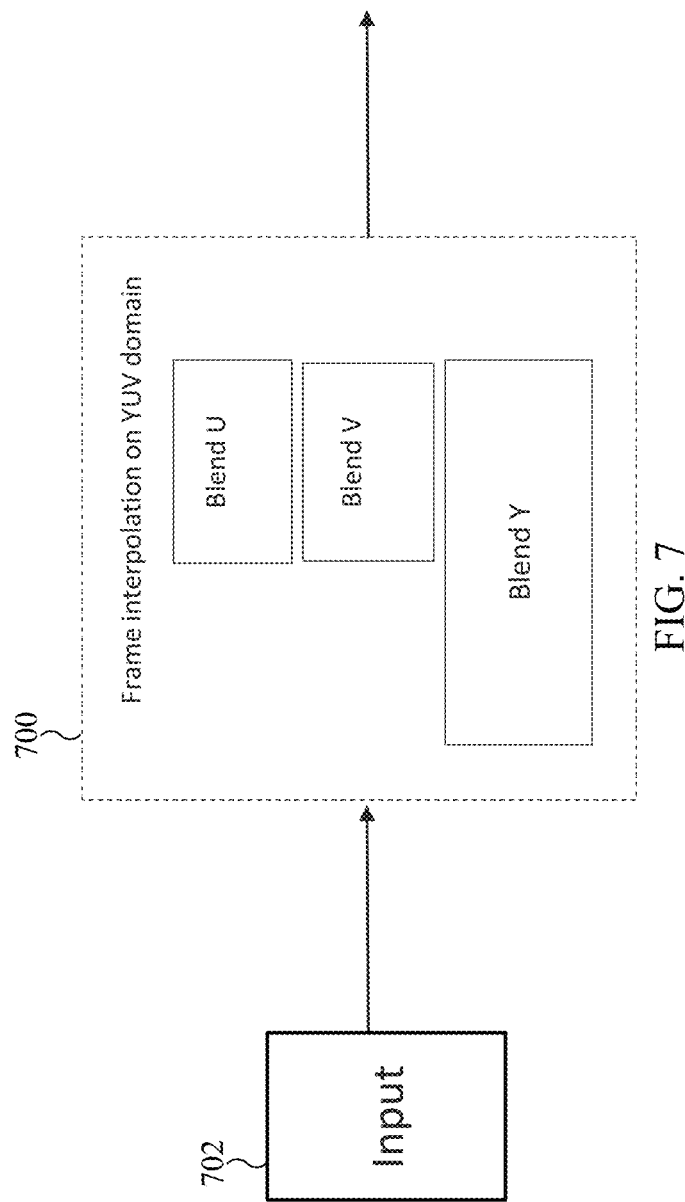
FIG. 7 illustrates an example frame blending function in accordance with this disclosure.

FIG. 7 illustrates an example frame blending function 700 in accordance with this disclosure. The function 700 here may, for example, represent an example implementation of the blending function 216 or the occlusion-aware alpha blending function 322.

As noted above, image frames being processed may be converted into the YUV domain for easier processing. The YUV domain includes a luminance or luma channel (Y) and chrominance or chroma channels (U and V). The Y channel generally defines brightness, and the U and V channels generally define color. Here, the function 700 receives inputs 702, which can include YUV versions of the video frames being used for interpolation. The function 700 also performs separate blending of the Y, U, and V channels of the frames to produce one or more interpolated frames. In some cases, the blending operations of the function 700 may be expressed as follows:

% For YUV, Y channel $xt0=\max(1,\min(\text{width},xx-t*u0(:,:,1)));$ $yt0=\max(1,\min(\text{height},yy-t*u0(:,:,2)));$ % For YUV, U and V channel $xt0c=\max(1,\min(\text{width}/2,xxc-t*u0c(:,:,1)));$ $yt0c=\max(1,\min(\text{height}/2,yyc-t*u0c(:,:,2)));$ % xx→(forward) xt1

$xt1=\max(1,\min(\text{width},xx-(1-t)*u1(:,:,1)));$ $yt1=\max(1,\min(\text{height},yy-(1-t)*u1(:,:,2)));$ % For YUV, U and V channel $xt1c=\max(1,\min(\text{width}/2,xxc-(1-t)*u1c(:,:,1)));$ $yt1c=\max(1,\min(\text{height}/2,yyc-(1-t)*u1c(:,:,2)));$ Although FIG. 7 illustrates one example of a frame blending function 700, various changes may be made to FIG. 7. For example, various components in FIG. 7 may be combined, further subdivided, replicated, omitted, or rearranged and additional components may be added according to particular needs. Also, any other suitable type of blending function may be used to produce one or more interpolated frames, and the blending function may operate in any suitable image data domain.

Figure 8:
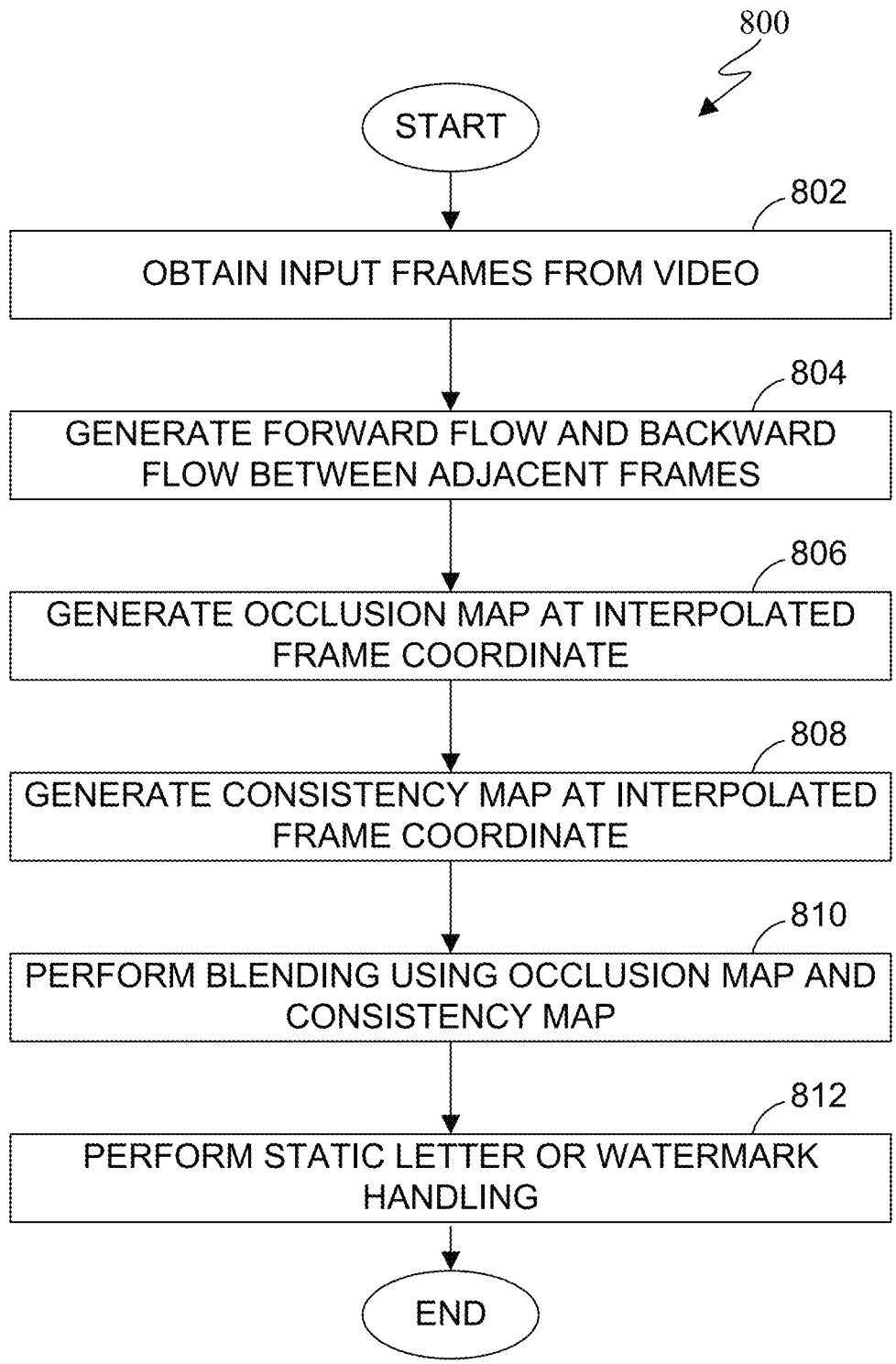
FIG. 8 illustrates an example method for pixel blending for synthesizing video frames with occlusion and watermark handling according to this disclosure.

FIG. 8 illustrates an example method 800 for pixel blending for synthesizing video frames with occlusion and watermark handling according to this disclosure. For case of explanation, the method 800 of FIG. 8 is described as being performed using the electronic device 101 of FIG. 1. However, the method 800 may be used with any other suitable system and any other suitable electronic device, such as in the server 106.

As shown in FIG. 8, the electronic device 101 obtains input frames from a video at step 802. The video may have been previously captured or otherwise generated at a defined frame rate, and playback of the video using interpolated frames may be requested. As a particular example, it may be requested to process the video for slow-motion playback, which means that one or more frames that do not currently exist need to be interpolated between the frames of the video.

The electronic device 101 generates a forward flow from a first input frame to a second input frame and a backward flow from the second input frame to the first input frame at step 804. The forward flow and the backward flow can be generated by an optical flow network. In some embodiments, the optical flow network can utilize a CNN or other trained machine learning model. The forward flow can represent a determination of pixel movements from the first input frame to the second input frame. The backward flow can represent a determination of pixel movements from the second input frame to the first input frame.

The electronic device 101 generates an occlusion map at an interpolated frame coordinate using the forward flow and the backward flow at step 806. For example, a forward interpolated frame occlusion map can be generated using the forward flow from the first input frame to an intermediate frame coordinate, and a backward interpolated frame occlusion map can be generated using the backward flow from the second input frame to the intermediate frame coordinate.

The electronic device 101 generates a consistency map at the interpolated frame coordinate using the forward flow and the backward flow at step 808. For example, the first input frame can be warped to the interpolated frame coordinate using the forward flow, the second input frame can be warped to the interpolated frame coordinate using the backward flow, and the consistency map can be generated based on a difference between the warped first input frame and the warped second input frame.

The electronic device 101 performs blending using the occlusion map and the consistency map to generate an interpolated frame at the interpolated frame coordinate at step 810. For example, a reliability mask can be generated by comparing the occlusion map to a threshold and comparing the consistency map to a threshold. When the reliability mask indicates that a pixel location is reliable, a pixel at the pixel location in the first input frame can be warped using the forward flow, a pixel at the pixel location in the second input frame can be warped using the backward flow, and an interpolated pixel at the pixel location can be generated by blending the warped pixel at the pixel location in the first input frame and the warped pixel at the pixel location in the second input frame. When the pixel location is not reliable, the interpolated pixel at the pixel location can be generated by warping the pixel at the pixel location in the first input frame using the forward flow.

The electronic device 101 performs static letter or watermark handling at step 812. For example, any static letter, watermark, or other region can be detected in the first input frame and the second input frame, and a static mask can be generated based on any detected static region(s). Interpolated pixels in the interpolated frame within the static region(s) can be replaced, such as with pixels from the first input frame.

Although FIG. 8 illustrates one example of a method 800 for pixel blending for synthesizing video frames with occlusion and watermark handling, various changes may be made to FIG. 8. For example, while shown as a series of steps, various steps in FIG. 8 may overlap, occur in parallel, occur in a different order, or occur any number of times.

Although this disclosure has been described with example embodiments, various changes and modifications may be suggested to one skilled in the art. It is intended that this disclosure encompass such changes and modifications as fall within the scope of the appended claims.

What is claimed is:

1. An apparatus comprising:
at least one processing device configured to:
obtain input frames from a video;
generate a forward flow from a first input frame to a second input frame and a backward flow from the second input frame to the first input frame;
generate an occlusion map at an interpolated frame coordinate using the forward flow and the backward flow;
generate a consistency map at the interpolated frame coordinate using the forward flow and the backward flow;
perform blending using the occlusion map and the consistency map to generate an interpolated frame at the interpolated frame coordinate;
detect a static letter or a watermark in the first input frame and the second input frame;
generate a static mask based on the detected static letter or watermark; and
replace interpolated pixels in the interpolated frame with pixels in one of the first and second input frames based on the static mask.

2. The apparatus of claim 1, wherein, to generate the occlusion map, the at least one processing device is configured to:
generate a forward occlusion map from the first input frame to the second input frame using the forward flow;
generate a backward occlusion map from the second input frame to the first input frame using the backward flow; and
warp the forward occlusion map and the backward occlusion map to generate the occlusion map at the interpolated frame coordinate.

3. The apparatus of claim 1, wherein, to generate the consistency map, the at least one processing device is configured to:
warp the first input frame to the interpolated frame coordinate using the forward flow;
warp the second input frame to the interpolated frame coordinate using the backward flow; and
generate the consistency map based on a difference between the warped first input frame and the warped second input frame.

4. An apparatus of claim 1, comprising:
at least one processing device configured to:
obtain input frames from a video;
generate a forward flow from a first input frame to a second input frame and a backward flow from the second input frame to the first input frame;
generate an occlusion map at an interpolated frame coordinate using the forward flow and the backward flow;
generate a consistency map at the interpolated frame coordinate using the forward flow and the backward flow; and
perform blending using the occlusion map and the consistency map to generate an interpolated frame at the interpolated frame coordinate;
wherein, to perform the blending, the at least one processing device is configured to:
compare the occlusion map and the consistency map to thresholds in order to generate a reliability mask;
when the reliability mask indicates that a pixel location is reliable, blend a pixel at the pixel location in the first input frame and a pixel at the pixel location in the second input frame to generate an interpolated pixel at the pixel location; and
when the reliability mask indicates that a pixel location is not reliable, generate the interpolated pixel at the pixel location using the pixel at the pixel location in the first input frame.

5. The apparatus of claim 4, wherein, to generate the interpolated pixel when the pixel location is reliable, the at least one processing device is configured to:
warp the pixel at the pixel location in the first input frame using the forward flow;
warp the pixel at the pixel location in the second input frame using the backward flow; and
blend the warped pixel at the pixel location in the first input frame and the warped pixel at the pixel location in the second input frame to generate the interpolated pixel at the pixel location.

6. The apparatus of claim 4, wherein, to generate the interpolated pixel when the pixel location is not reliable, the at least one processing device is configured to warp the pixel at the pixel location in the first input frame using the forward flow to generate the interpolated pixel at the pixel location.

7. The apparatus of claim 4, wherein the at least one processing device is further configured to:
detect a static letter or a watermark in the first input frame and the second input frame;
generate a static mask based on the detected static letter or watermark; and
replace interpolated pixels in the interpolated frame with pixels in one of the first and second input frames based on the static mask.

8. A method comprising:
obtaining input frames from a video;
generating a forward flow from a first input frame to a second input frame and a backward flow from the second input frame to the first input frame;
generating an occlusion map at an interpolated frame coordinate using the forward flow and the backward flow;
generating a consistency map at the interpolated frame coordinate using the forward flow and the backward flow;
performing blending using the occlusion map and the consistency map to generate an interpolated frame at the interpolated frame coordinate;
detecting a static letter or a watermark in the first input frame and the second input frame;
generating a static mask based on the detected static letter or watermark; and
replacing interpolated pixels in the interpolated frame with pixels in one of the first and second input frames based on the static mask.

9. The method of claim 8, wherein generating the occlusion map comprises:
generating a forward occlusion map from the first input frame to the second input frame using the forward flow;

generating a backward occlusion map from the second input frame to the first input frame using the backward flow; and warping the forward occlusion map and the backward occlusion map to generate the occlusion map at the interpolated frame coordinate.

10. The method of claim 8, wherein generating the consistency map comprises:

warping the first input frame to the interpolated frame coordinate using the forward flow;

warping the second input frame to the interpolated frame coordinate using the backward flow; and generating the consistency map based on a difference between the warped first input frame and the warped second input frame.

11. The method of claim 8, wherein performing the blending comprises:

comparing the occlusion map and the consistency map to thresholds in order to generate a reliability mask;

when the reliability mask indicates that a pixel location is reliable, blending a pixel at the pixel location in the first input frame and a pixel at the pixel location in the second input frame to generate an interpolated pixel at the pixel location; and when the reliability mask indicates that a pixel location is not reliable, generating the interpolated pixel at the pixel location using the pixel at the pixel location in the first input frame.

12. The method of claim 11, wherein generating the interpolated pixel when the pixel location is reliable comprises:

warping the pixel at the pixel location in the first input frame using the forward flow;

warping the pixel at the pixel location in the second input frame using the backward flow; and blending the warped pixel at the pixel location in the first input frame and the warped pixel at the pixel location in the second input frame to generate the interpolated pixel at the pixel location.

13. The method of claim 11, wherein generating the interpolated pixel when the pixel location is not reliable comprises warping the pixel at the pixel location in the first input frame using the forward flow to generate the interpolated pixel at the pixel location.

14. The method of claim 8, wherein the interpolated pixels in the interpolated frame are replaced with pixels in the first input frame based on the static mask.

15. A non-transitory computer readable medium containing instructions that when executed cause at least one processor to:

obtain input frames from a video;

generate a forward flow from a first input frame to a second input frame and a backward flow from the second input frame to the first input frame;

generate an occlusion map at an interpolated frame coordinate using the forward flow and the backward flow;

generate a consistency map at the interpolated frame coordinate using the forward flow and the backward flow; and perform blending using the occlusion map and the consistency map to generate an interpolated frame at the interpolated frame coordinate;

wherein the instructions that when executed cause the at least one processor to perform the blending comprise instructions that when executed cause the at least one processor to:

compare the occlusion map and the consistency map to thresholds in order to generate a reliability mask;

when the reliability mask indicates that a pixel location is reliable, blend a pixel at the pixel location in the first input frame and a pixel at the pixel location in the second input frame to generate an interpolated pixel at the pixel location; and when the reliability mask indicates that a pixel location is not reliable, generate the interpolated pixel at the pixel location using the pixel at the pixel location in the first input frame.

16. The non-transitory computer readable medium of claim 15, wherein the instructions that when executed cause the at least one processor to generate the occlusion map comprise instructions that when executed cause the at least one processor to:

generate a forward occlusion map from the first input frame to the second input frame using the forward flow;

generate a backward occlusion map from the second input frame to the first input frame using the backward flow; and warp the forward occlusion map and the backward occlusion map to generate the occlusion map at the interpolated frame coordinate.

17. The non-transitory computer readable medium of claim 15, wherein the instructions that when executed cause the at least one processor to generate the consistency map comprise instructions that when executed cause the at least one processor to:

warp the first input frame to the interpolated frame coordinate using the forward flow;

warp the second input frame to the interpolated frame coordinate using the backward flow; and generate the consistency map based on a difference between the warped first input frame and the warped second input frame.

18. The non-transitory computer readable medium of claim 15, wherein the instructions that when executed cause the at least one processor to generate the interpolated pixel when the pixel location is reliable comprise instructions that when executed cause the at least one processor to:

warp the pixel at the pixel location in the first input frame using the forward flow;

warp the pixel at the pixel location in the second input frame using the backward flow; and blend the warped pixel at the pixel location in the first input frame and the warped pixel at the pixel location in the second input frame to generate the interpolated pixel at the pixel location.

19. The non-transitory computer readable medium of claim 18, wherein the instructions that when executed cause the at least one processor to generate the interpolated pixel when the pixel location is not reliable comprise:

instructions that when executed cause the at least one processor to warp the pixel at the pixel location in the first input frame using the forward flow to generate the interpolated pixel at the pixel location.

20. The non-transitory computer readable medium of claim 15, wherein the instructions when executed further cause the at least one processor to:

detect a static letter or a watermark in the first input frame and the second input frame;

generate a static mask based on the detected static letter or watermark; and replace interpolated pixels in the interpolated frame with pixels in the first input frame based on the static mask.

* * * * *